US011328301B2

(12) United States Patent
Butvinik

(10) Patent No.: US 11,328,301 B2
(45) Date of Patent: May 10, 2022

(54) ONLINE INCREMENTAL MACHINE LEARNING CLUSTERING IN ANTI-MONEY LAUNDERING DETECTION

(71) Applicant: Actimize LTD., Ra'anana (IL)

(72) Inventor: Danny Butvinik, Haifa (IL)

(73) Assignee: ACTIMIZE LTD., Ra'anana (IL)

( * ) Notice: Subject to any disclaimer, the term of this patent is extended or adjusted under 35 U.S.C. 154(b) by 111 days.

(21) Appl. No.: 16/826,241

(22) Filed: Mar. 22, 2020

(65) Prior Publication Data

US 2021/0312449 A1  Oct. 7, 2021

(51) Int. Cl.
  *G06Q 40/00*  (2012.01)
  *G06Q 20/40*  (2012.01)
  *G06N 20/00*  (2019.01)

(52) U.S. Cl.
  CPC ......... *G06Q 20/4016* (2013.01); *G06N 20/00* (2019.01)

(58) Field of Classification Search
  CPC .......................... G06Q 20/4016; G06N 20/00
  See application file for complete search history.

(56) References Cited

U.S. PATENT DOCUMENTS

| 8,533,825 | B1 * | 9/2013 | Marsa | ................. | H04L 63/1425 726/22 |
| 2014/0058763 | A1 * | 2/2014 | Zizzamia | ............... | G06Q 40/08 705/4 |
| 2017/0169174 | A1 * | 6/2017 | Yeung | ................. | G16H 50/20 |
| 2017/0270428 | A1 * | 9/2017 | Zoldi | ................. | G06Q 20/4016 |
| 2017/0270534 | A1 * | 9/2017 | Zoldi | ................. | G06F 16/24578 |

(Continued)

FOREIGN PATENT DOCUMENTS

| CN | 106326913 | * | 1/2017 | ........... G06K 9/6222 |
| CN | 111445259 | * | 7/2020 | ......... G06Q 30/0185 |

OTHER PUBLICATIONS

Adil Fahad et al., "A Survey of Clustering Algorithms for Big Data: Taxonomy and Empirical Analysis," IEEE Transactions on Emerging Topics in Computing, vol. 2, No. 3, Sep. 2014 (Year: 2014).*

(Continued)

*Primary Examiner* — Alexander G Kalinowski
*Assistant Examiner* — William B. Bunker
(74) *Attorney, Agent, or Firm* — Soroker Agmon Nordman

(57) ABSTRACT

A computerized-method for real-time detection of financial transactions suspicious for money-laundering, by processing high-speed streaming financial data. In a computerized-system receiving a financial data stream comprised of data points. Operating a Fused-Density (FD)-based clustering module that is configured to: (i) read the data points; (ii) maintain a grid system; (iii) maintain one or more provisional clusters (PROC)s; (iv) associate each data point with a grid or merge it to a PROC; (v) systemize the grid system and the PROCs; (vi) trim one or more grids and remove one or more PROCs; (vii) form one or more shape devise clusters based on the PROCs; and (viii) transmit the one or more shape devise clusters for analysis thereof, thus, enabling detection of financial transactions suspicious for money-laundering according to the one or more shape devise clusters which were formed out of the high-speed streaming financial data with money-laundering changing trends.

10 Claims, 12 Drawing Sheets

(56) References Cited

U.S. PATENT DOCUMENTS

| | | | | |
|---|---|---|---|---|
| 2018/0204111 | A1* | 7/2018 | Zadeh | G06N 3/0436 |
| 2018/0365696 | A1* | 12/2018 | Yan | H04L 63/1425 |
| 2019/0325528 | A1* | 10/2019 | Adjaoute | G06Q 20/4016 |
| 2020/0394707 | A1* | 12/2020 | Guo | G06Q 40/02 |
| 2021/0224922 | A1* | 7/2021 | Juban | G06Q 30/06 |

OTHER PUBLICATIONS

Sharma et al., "Clustering analysis using an adaptive fused distance," Engineering Applications of Artificial Intelligence, 96 (2020) 103928, received Mar. 27, 2020. (Year: 2020).*

Duan et al., "Business Intelligence for Enterprise Systems: A Survey," IEEE Transactions on Industrial Informatics, vol. 8, No. 3, 2012 (Year: 2012).*

Hassanien et al., "Big Data in Complex Systems: Challenges and Opportunities," Chapter entitled: "Stream Clustering Algorithms: A Primer," Springer International Publishing, 2015 (Year: 2015).*

Goswami et al., "Quartile Clustering: A quartile based technique for Generating Meaningful Clusters," Journal of Computing, vol. 4, Issue 2, 2017 (Year: 2017).*

Gao et al., "An Incremental Data Stream Clustering Algorithm Based on Dense Units Detection," Springer-Verlag, 2005 (Year: 2006).*

* cited by examiner

ONLINE INCREMENTAL MACHINE LEARNING CLUSTERING IN ANTI-MONEY LAUNDERING DETECTION

TECHNICAL FIELD

The present disclosure relates to the field of online incremental machine learning clustering paradigm in which data becomes available in a sequential order and is used to update the best predictor for future data at each step, as opposed to a classical machine learning approaches with offline batch learning techniques.

BACKGROUND

Financial institutions including banks, brokerage firms and insurance companies are required by law to monitor and report suspicious financial activities that may relate to money laundering and terrorist financing. As such, Anti-Money Laundering (AML) compliance officers must create and maintain an effective transaction monitoring program to keep up with evolving regulations and control their AML program costs. Missteps of these financial institutions, might result in fines and a reputational damage.

Anti-Money Laundering (AML) refers to a set of financial and technological controls that aim to combat an entrance of "dirty money" i.e., money that has been illegally gained through illegal activities such as forgery, bribery, prostitution or theft, into financial systems. Therefore, a robust AML detection system that is operating in a financial system must have the ability to automatically detect any unusual or anomalous financial transactions which have been committed via the financial system.

Nowadays, the industry is implementing a retrospective reporting of suspicious financial transactions, rather than intercepting suspicious financial transactions in real-time. The regulation guidelines are not particularly clear on the timing in which suspicious financial transactions have to be addressed. While retrospective reporting is the current standard there is also a regulatory language that suggests that if a financial transaction is not consistent with what is expected, it should not be completed. In other words, the suspicious financial transaction should be identified as such and rejected.

Accordingly, there is a need for a technical solution that will reject suspicious financial transactions, and stop fraudsters immediately and potentially thwart the additional harm that their actions cause the community and the broader economy.

In addition, as criminals become ever more technically proficient, Financial Institutions (FI)s find themselves in a constant arms race, attempting to stay one step ahead. In recent years, the main issue in anti-fraud activity has been the diversity of fraud types because of the challenges that it imposes on its detection by the FI systems. A wide range of new threats and possibilities have immerged, as technological changes inside and outside the FIs have exposed them to faster payments, risky intermediaries, and new technical environments.

Across the world, the time taken to process and clear payments is speeding up, and to respond effectively Anti-Money Laundering (AML) systems must be both fast and accurate. For prompt response and accuracy, AML systems need continuous analytics on streaming financial data and an online incremental machine learning models to adopt to changing trends in data.

Therefore, there is a need for a method and a system for real-time automatic handling of massive amounts of financial data to evaluate and detect unusual or anomalous financial transactions with low maintenance and lightweight production.

Furthermore, there is a need for a method and a system for identifying new trends in the data by an implementation of an online incremental clustering machine learning models.

SUMMARY

There is thus provided, in accordance with some embodiments of the present disclosure, a computerized-method for real-time detection of financial transactions which are suspicious for money laundering, by processing high-speed streaming financial data. In a computerized-system comprising a processor, and a memory, receiving by the processor a financial data stream comprised of data points.

Furthermore, in accordance with some embodiments of the present disclosure, operating by the processor a Fused-Density (FD)-based clustering module. The FD-based clustering module may be configured to: (i) read data points in the received financial data stream; (ii) maintain a grid system of one or more grids; (iii) maintain one or more provisional clusters (PROC)s; (iv) associate each data point with a grid or merge it to a PROC; (v) systemize the grid system and the PROCs; (vi) trim one or more grids which their calculated weight is less than a calculated outlier and removing one or more PROCs which their calculated weight is less than a calculated value of weight of a PROC; (vii) form one or more shape devise clusters based on the PROCs after a calculated minimum time; and (viii) transmit the one or more shape devise clusters for analysis thereof, thus, enabling detection of financial transactions suspicious for money laundering according to the one or more shape devise clusters which were formed out of the high-speed streaming financial data with money laundering changing trends.

Furthermore, in accordance with some embodiments of the present disclosure, the associating of each data point with a grid or the merging of each data point to a PROC may be further performed by the FD-based clustering module by: (i) for each PROC maintaining a center point of each PROC; (ii) for each data point in each grid, maintaining a radius within a calculated neighborhood; (iii) calculating a distance between each data point and a center of each PROC in the one or more PROCs; when a calculated distance between the data point and the center of a related PROC is less than a radius of the related PROC: (iv) merging to the PROC; and when the calculated distance between the data point and the center of a related PROC is greater or equal to the radius of the related PROC: (v) associating to a grid in the grid system according to predefined distance metrics.

Furthermore, in accordance with some embodiments of the present disclosure, a neighborhood of a data point p may be calculated or denoted by $N_\varepsilon(p)$.

$$N_\varepsilon(p)=\{q\in D\ \text{dist}(p,\ q)\leq\varepsilon\},$$

where dist (p, q) is an Euclidean distance between data points p and q.

An Euclidean distance is straight-line distance between two data points such as p and q in Euclidean space.

Furthermore, in accordance with some embodiments of the present disclosure, the systemizing of the grid system and the PROCs may be further performed by the FD-based clustering module by: (i) maintaining a number of data points in each grid in the grid system; (ii) checking the number of data points in each grid; when the number of data points in a grid is higher than a calculated dense grid threshold (iii) calculating a weight of the grid in the grid system by: a. calculating a weight for each read data point according to a preconfigured function in each time unit; b. calculating a weight for each grid according to a predetermined function in each time unit; and c. updating the weight for each grid according to a predetermined function.

Furthermore, in accordance with some embodiments of the present disclosure, when one or more grids are forming a pattern in the grid system and each one is having a calculated weight that is higher than a weight of a prospect PROC, then, the FD-based clustering module may generate a PROC having a shape similar to the pattern in the grid system, and may calculate weight, center and radius of the generated PROC.

According to some embodiments of the present disclosure, a time unit may be preconfigured to be any value such as 1 second, 5 seconds or 1 millisecond and the like.

Furthermore, in accordance with some embodiments of the present disclosure, the preconfigured function to calculate the weight of each data point may be:

$$w(x, t_c) = w(x \cdot t_p) f(t_c, t_p),$$

whereby:
x is the data point,
$f(t_c, t_p)$ is a fading function,
$t_c$ is a current time unit, and
$t_p$ is previous time unit.

Furthermore, in accordance with some embodiments of the present disclosure, the calculated weight may decrease in each time unit compared to calculated weight in preceded time unit. A time unit may be preconfigured to be 1 second, 5 seconds or 1 millisecond or any other value.

Furthermore, in accordance with some embodiments of the present disclosure, the predetermined function to calculate the weight of each grid may be:

$$w(g, t_c) = \sum_{x \in g} 2^{-\lambda(t_c - t_x)}$$

whereby:
g is the grid,
$t_c$ is a current time unit,
$\lambda$ is preconfigured and $\lambda > 0$,
$t_x$ is a timestamp of data point x in the grid.

Furthermore, in accordance with some embodiments of the present disclosure, the updating of the weight of each grid may be further performed by recalculating the weight of each data point according to the predetermined function and summing all the recalculated weights. Each data point may be attributed with a timestamp, and the predetermined function may be:

$$w_g(t_c, x) = 2^{-\lambda(t_c - t_p)} \cdot w_g(t_p) + 1$$

whereby:
g is the grid,
x is a data point,
$t_c$ is a current time unit,
$\lambda$ is preconfigured and $\lambda > 0$,
$t_p$ is previous time unit.

Furthermore, in accordance with some embodiments of the present disclosure, the calculating of dense grid threshold may be performed according to:

$$w_g(t) \geq \alpha / N(1 - 2^{-\lambda})$$

whereby:
$w_g(t)$ is a weight of a grid in time unit t,
$\alpha$ is a maximum preconfigured value,
$\lambda$ is preconfigured and $\lambda > 0$, and
N is the number of data points in the grid.

Furthermore, in accordance with some embodiments of the present disclosure, the fading function may be:

$$f(t_c) = 2^{-\lambda \cdot t_p},$$

whereby:
$\lambda$ is preconfigured and $\lambda > 0$.

Furthermore, in accordance with some embodiments of the present disclosure, the calculated outlier may be according to:

$$OWT(t_c, t_p) = \frac{\alpha}{N} \sum_{i=0}^{t_c - t_p} 2^{-\lambda i} = \frac{a(1 - 2^{-\lambda(t_c - t_p + 1)})}{N(1 - 2^{-\lambda t_p})}$$

whereby:
$t_c$ is a current time unit,
$t_p$ is previous time unit.
$\lambda$ is preconfigured and $\lambda > 0$,
$\alpha$ is a maximum preconfigured value,
N is the number of data points in the grid.

Furthermore, in accordance with some embodiments of the present disclosure, the calculated value of weight of a PROC or a prospect PROC is performed according to:

$$w_{PROC} = w_g(t), \; w_g(t) = \frac{\alpha}{N(1 - 2^{-\lambda})}$$

whereby:
$w_{PROC}$ is a weight of a PROC or a prospect PROC,
$w_g(t)$ is a weight of a grid in time unit t,
$\lambda$ is preconfigured and $\lambda > 0$,
$\alpha$ is a maximum preconfigured value,
N is the number of data points in the grid.

Furthermore, in accordance with some embodiments of the present disclosure, the calculated minimum time may be performed according to:

$$t_{TT} = \log_\lambda \frac{\alpha}{\alpha - N(1 - 2^{-\lambda})}$$

whereby:
$\lambda$ is preconfigured and $\lambda > 0$,
$\alpha$ is a maximum preconfigured value,
N is the number of data points in the grid.

Furthermore, in accordance with some embodiments of the present disclosure, the calculated minimum time $t_{TT}$ has been developed from:

$$w_{PROC}(t_c) = 2^{-\lambda(t_c - t_p)} \cdot w_{PROC}(t_c) + 1$$

$$\alpha/N(1 - 2^{-\lambda}) = 2^{-\lambda(t_c - t_p)} \cdot \alpha/N(1 - 2^{-\lambda}) 30 \; 1$$

whereby:

$$t_{TT} = t_c - t_p \;\; t_{TT} = \log_\lambda \frac{\alpha}{\alpha - N(1 - 2^{-\lambda})}$$

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

Figure 1:
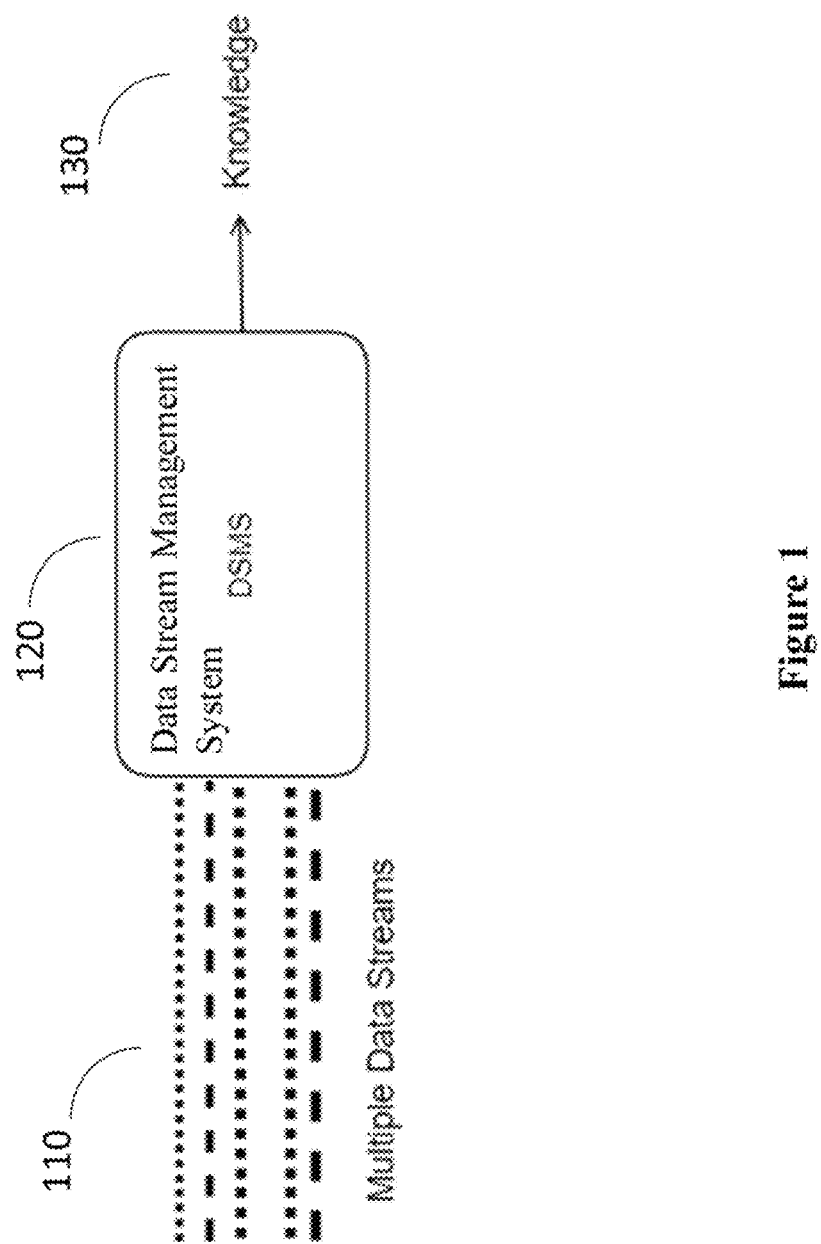
FIG. 1 is a high-level diagram of a Data Stream Management System (DSMS), in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "shape devise clusters" as used herein refers to clusters which are formed in a certain shape which may be visualized on a display unit or may be forwarded to a computerized entity for further analysis based on the clusters shape, contour or pattern.

The term "Online Incremental Machine Learning model" as used herein refers to a paradigm where input data is continuously used to extend an existing machine learning model's knowledge in real-time by continuously training the machine learning model. It represents a dynamic technique of a supervised learning and an unsupervised learning that can be applied when training data becomes available gradually over time. Algorithms that can facilitate incremental learning are known as incremental machine learning algorithms. It can be clustering algorithms or classification/regression algorithms and others.

The term "dirty money" as used herein refers to money that has been illegally gained through illegal activities such as forgery, bribery, prostitution or theft.

The term "Anti-money laundering (AML)" as used herein refers to a set of financial and technological controls that aim to combat the entrance of dirty money into financial systems.

The terms "clearing" or "clear" as used herein refer to all the activities related to a financial commitment for a financial transaction from the time the financial commitment is made until it is settled.

The terms "suspicious financial activity" or "suspicious financial transactions" as used herein refer to activities which are related to money laundering and terrorist financing The term "data point" as used herein refers to a set of all the attributes of a customer or a financial account, such as, the customer's demographic information, customer behavior profile and any other dynamic elements or attributes. Each data point may have one or more dimensions.

The term "financial data stream" as used herein refers to a data stream that is comprised of data points and streamed into an unsupervised machine learning model to create shape devise clusters. Knowledge, i.e., assumptions or interpretations as to suspicious financial activity is generated by an analyzer via a display unit according to the shape devise clusters or an application that is configured to analyze the created shape devise clusters.

The terms "dataset" as used herein refer to a collection of data that is comprised of data points.

The terms "sparse dataset" as used herein refers to a dataset that is comprised of data points in which most attributes' value in each data point equals zero. For example, a data point in a sparse dataset which represents a financial transaction may consist of attributes with the following values: [1,23,0,0,0,4,'abc',0,0,0,0,0,0,0,0,0,0,0,0,0].

The term "de-risking" as used herein refers to the practice of financial institutions that are terminating or restricting business relationships with clients or categories of clients to avoid risk, rather than managing it.

The term "noise" as used herein refers to meaningless information in data points in a dataset. It may include data corruption or any data that a user or a system cannot understand and interpret correctly.

The term "batch clustering" as used herein refers to clustering of static data that is performed offline. Batch clustering has no flexibility to changes in data and cannot catch new trends in data. It has heavy production workload and cannot process a growing amount of data.

The terms "sequential clustering" or "streaming clustering" as used herein refer to clusters of streaming data in real time or near real time i.e., online, automatic evaluation that has the ability to catch new trends in data. It has lightweight production workload and it is suitable to tackle massive amounts of data.

The tem "revenue stream" as used herein refers to a recurring revenue, or transaction-based revenue, or project revenue, or service revenue. A recurring revenue is a revenue that is likely to continue to be generated regularly for a significant period of time. It is typically used by companies that sell subscriptions or services. It may take the form of bills paid monthly by consumers, or commercial contracts lasting several years. Transaction-based revenue based on predictable sales of goods. A revenue may be earned by a transaction that is received from a customer. For example, A customer in a clothing store, buying a new jacket, generates a transaction-based revenue. This type of revenue is often considered less attractive than the recurring model because an action is required to attract customers.

According to some embodiments of the present disclosure, a time unit may be preconfigured to be any value: 1 second, 5 seconds or 1 millisecond and the like.

Financial institutions are legally obligated to monitor and report suspicious financial activities that may relate to money laundering and terrorist financing. They are governed by regulations from various countries, such as the Bank Secrecy Act and the USA PATRIOT Act in the United States, the Third EU Directive in Europe, Articles on the Criminalization of Money Laundering in Japan and others. Not fulfilling these requirements might lead to fines and negative impact to the organization's brand and reputation.

Monitoring a financial account activity and financial transactions flowing through the systems of a financial institution is critical to prevent money laundering or terrorist financing. Suspicious financial activities, and patterns of financial transactions must be detected and reported to authorities in accordance with corporate rules, local laws and/or national and international regulations. In most cases, these reports must be sent within determined timeframes, therefore these financial institutions need strong and reliable business processes implemented in their systems, as well as enabling technology solutions, to meet these guidelines. Financial institutions are also required to respond expeditiously to search requests from government authorities, sometimes within 48 hours.

Accordingly, there is a need for a technological solution and implementation of processes that will identify unusual financial transactions and suspicious financial activity patterns for these financial institutions. Since these financial activities may not be suspicious in all cases, there is a need for analysis and determination if an activity or patterns of financial transactions are suspicious in nature with regards to, among other things, potential money laundering or terrorist financing.

According to some embodiments of the present disclosure, a streaming environment is a stream processing which analyzes and performs actions on real-time data through the use of continuous queries. Streaming analytics connects to external data sources, enabling applications to integrate certain data into the application flow, or to update an external database with processed information.

Streaming analytics is the ability to constantly calculate statistical analytics while moving within the stream of data. Streaming analytics allows management, monitoring, and real-time analytics of live streaming data. Streaming analytics involves knowing and acting upon events happening in a business at any given moment. Since streaming analytics occurs immediately, computerized systems of companies must quickly process the analytics data within a small window of opportunity before the data loses its value. The data may originate from market data, banks, financial transactions, sensors, mobile phones and the Web. Data that loses its value results in additional costs such as: operational, administrative, business risks, reputation damage, potential legal action, reduction in productivity, inability to make informed decisions, and reduces a company's competitive edge.

According to some embodiment of the present disclosure, streaming analytics may tap into streams of various data sources, continuously aggregates that data, and merges it in real time with most updated customers information. Each financial operation that clients of FIs make, the streaming analytics may calculate the latest trends, patterns and deviations in massive online streams of data.

According to some embodiment of the present disclosure, an implementation of streaming analytics in FIs systems may provide companies the ability to analyze financial data as soon as it becomes available, and provide the ability to analyze risks before they arise or before they become a problem.

According to some embodiment of the present disclosure, the implementation of streaming analytics in FIs systems may help companies to identify new business opportunities and revenue streams which may result in an increase in profits, new customers, and improved customer service.

According to some embodiment of the present disclosure, the implementation of streaming analytics in FIs systems may process millions and tens of millions of events per second. Because data in a streaming analytics environment is processed before it is stored in a database, the technology supports much faster decision making than currently available in traditional data analytics technologies.

According to some embodiment of the present disclosure, the implementation of streaming analytics in FIs systems may provide security protection because it gives companies a fast way to rapidly connect different events to detect security threat patterns e.g., shape devise clusters and their risks, and to perform security monitoring of network and physical assets.

FIG. 1 schematically illustrates a high-level diagram of a Data Stream Management System (DSMS) 120, in accordance with some embodiments of the present invention.

The industry has traditionally been focused on the retrospective reporting of suspicious financial transactions in Anti-Money Laundering (AML), rather than intercepting transactions in real-time. Accordingly, there is a need for a technical solution for a real-time detection of financial transactions which are suspicious for money laundering, by processing high-speed streaming financial data which may stop fraudsters immediately and thwart the additional harm their actions cause the community and the broader economy. Across the world, the time taken to process and clear payments is speeding up, and to respond effectively AML systems must be intelligent, and both fast and accurate.

In this context, intelligent clustering means clustering of financial data for practicing effective AML which is characterized in: (i) continuous learning over time which means that evolving trends are quickly identified; (ii) immense scalability which means that it can look across more financial transactions to deliver better outcomes; and (iii) transparency which means that everyone, from the internal model review board to the regulator, knows what is driving the clustering analysis, the scenarios and the threshold setting.

Accordingly, there is a need for a technical solution for AML systems to implement dynamic and continuous analytics i.e., streaming analytics by an online incremental machine learning framework in which financial transactions arrive one at each time unit as a data point and assigned to either a new cluster or an existing cluster without the benefit of having observed the entire sequence or dataset, in real time. This is as opposed to batch clustering or learning approach that is currently implemented in machine learning models where clustering analysis is applied on static batch datasets.

According to some embodiments of the present disclosure, streaming clustering of business segments as real-time financial data streams such as multiple data streams 110 may be performed. A DSMS such as DSMS 120, may receive by operating an FD-based clustering module, the multiple data streams and process it in real-time or near real time to output knowledge 130 which may assist in identifying suspicious financial activity. The multiple data streams may be comprised of data points.

According to some embodiments of the present disclosure, the output knowledge 130 may be shape devise clusters which may be visualized on a display unit or may be forwarded to a computerized entity for further analysis based on the clusters shape, contour or pattern. The analysis may be performed by an analyzer via a display unit which represents the shape devise clusters thereon or an application that is configured to analyze the created shape devise clusters to yield assumptions or interpretations as to suspicious financial activity.

According to some embodiments of the present disclosure, a data stream may be an ordered sequence of instances or financial records e.g., data points which are arriving at each time unit to the DSMS 120. During the operation of the DSMS 120 the FD-based clustering module may not be aware of the entire sequence of data points and the data may change or evolve over time. Furthermore, the DSMS 120 may not store the data that is received in the multiple data streams 110 due to limited computational resources. After the DSMS 120 analyses the data it is discarded or being summarized.

According to some embodiments of the present disclosure, the DSMS 120 may implement a sequential clustering algorithm which deals with fast queries of high-dimensional objects in a sequential order and in a streaming manner. Accordingly, the implementation of DSMS 120 in systems of financial institutions, may provide a real-time AML approach, where financial institutions may use the output knowledge 130 to identify suspicious financial activity and to immediately bring it to a full stop and immediately mitigate any ancillary harm caused by any money laundering.

Regulators prefer an approach where money laundering risk is addressed case-by-case basis which, on the whole, is healthier for the financial industry. According to some embodiments of the present disclosure, the real-time AML may be also aligned with regulators' efforts to restrain de-risking, where a financial institution may use the DSMS 120 to mine out knowledge 130 from a financial transaction or a customer type which may be received as multiple data stream 110 in the DSMS 120 and thus to eliminate money laundering risk.

According to some embodiments of the present disclosure, an accurate detection of unusual financial behavior may be achieved earlier and faster with minimum False-Positives (FP)s, with maximum True-Positives (TP)s and without missing crime alerts in AML systems of the financial institutions.

Figure 2A:
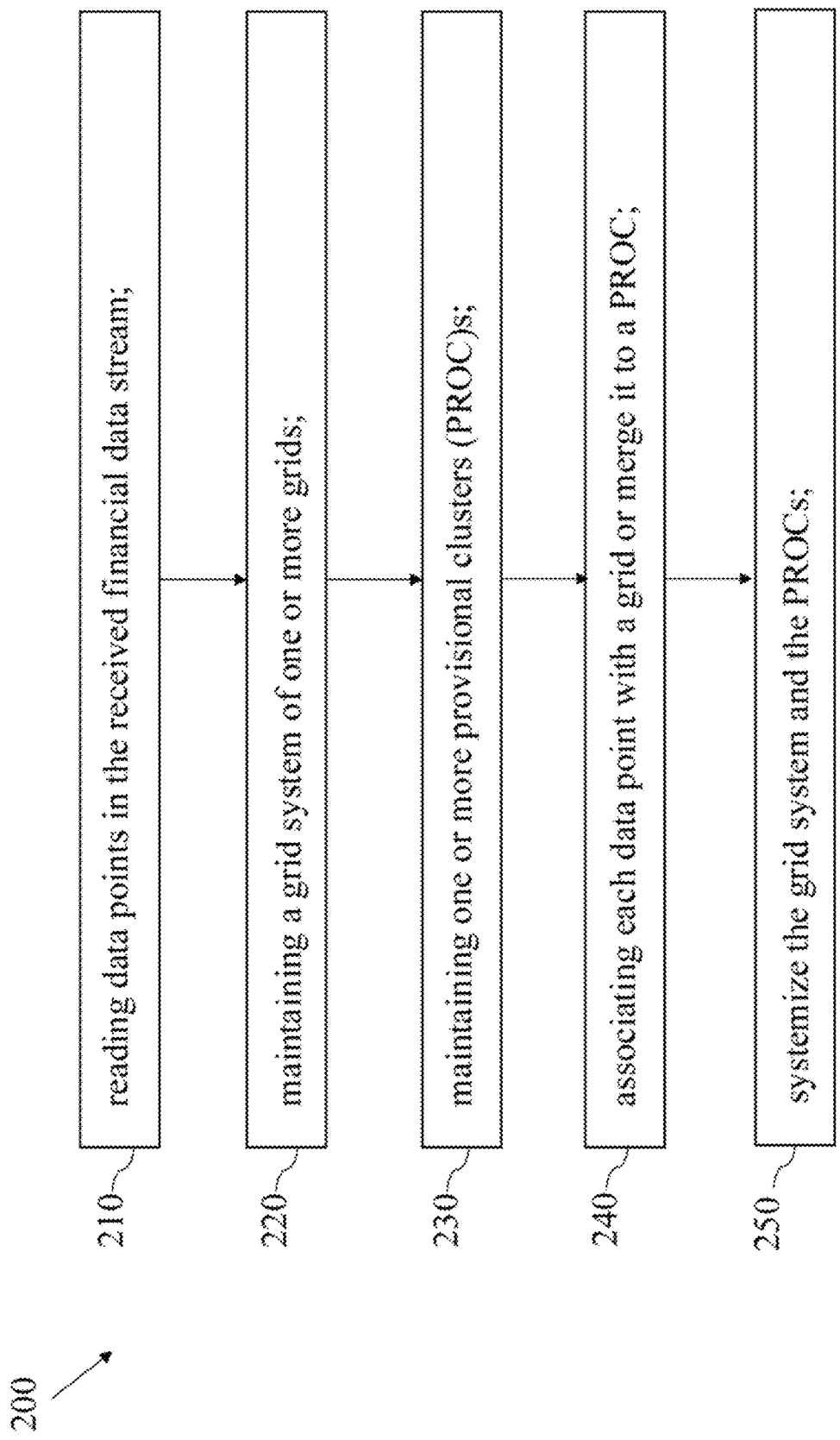
FIGS. 2A-2B are representing a flowchart depicting operations performed by a Fused-Density (FD)-based clustering module 200, in accordance with some embodiments of the present invention.
Figure 2B:
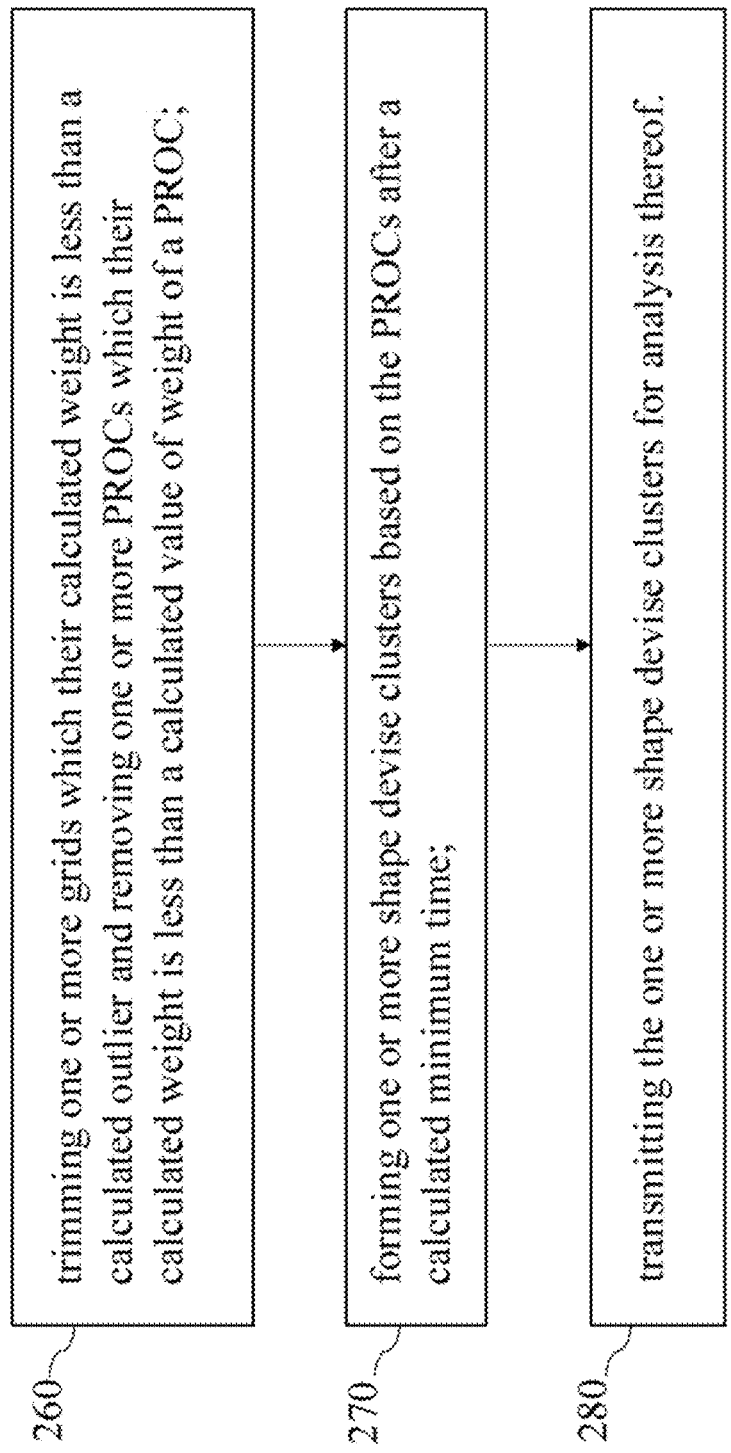

FIGS. 2A-2B are a flowchart depicting operations performed by a Fused-Density (FD)-based clustering module 200, in accordance with some embodiments of the present invention.

According to some embodiments of the present disclosure, a density-based clustering method is a prominent class in clustering data streams. It has the ability to detect arbitrary shape devise clusters, to handle outliers, and it does not require the number of clusters in advance. Therefore, density-based clustering algorithm may be a proper choice for online clustering of streaming financial data. However, density-based clustering may be present a limited processing time issue and a challenge computing resources usage.

According to some embodiments of the present disclosure, density-based clustering algorithm may be implemented for online clustering streaming of financial data in such a manner that enables fast processing time to be applicable in a real-time application.

According to some embodiments of the present disclosure, operation 210 may comprise reading data points in the received financial data stream.

According to some embodiments of the present disclosure, operation 220 may comprise maintaining a grid system of one or more grids.

According to some embodiments of the present disclosure, operation 230 may comprise maintaining one or more provisional clusters (PROC)s.

According to some embodiments of the present disclosure, operation 240 may comprise associating each data point with a grid or merging it to a PROC.

According to some embodiments of the present disclosure, operation 250 may comprise systemize the grid system and the PROCs.

According to some embodiments of the present disclosure, operation 260 may comprise trimming one or more grids which their calculated weight is less than a calculated outlier and removing one or more PROCs which their calculated weight is less than a calculated value of weight of a PROC.

According to some embodiments of the present disclosure, operation 270 may comprise forming one or more shape devise clusters based on the PROCs after a calculated minimum time.

According to some embodiments of the present disclosure, operation 280 may comprise transmitting the one or more shape devise clusters for analysis thereof. Thus, enabling detection of financial transactions suspicious for money laundering according to the one or more shape devise clusters which were formed out of the high-speed streaming financial data with money laundering changing trends by incremental learning thereof.

According to some embodiments of the present disclosure, FD-based clustering module 200 in FIGS. 2A-2B searches only in a potential list and if it cannot find a suitable PROC, the data point is mapped to a grid, which keeps the outlier buffer. Thus, the time complexity of FD-based clustering module 200 in FIGS. 2A-2B that is using grid-based clustering may be reduced. The grid-based method decreases merging time complexity from O(n) to O(1).

According to some embodiments of the present disclosure, in FD-based clustering module 200 in FIGS. 2A-2B the grid list may be implemented in a 2-3-4 tree data structure which makes search and update faster. The size of the grid list may be $$O\left(\log_{\frac{1}{\lambda}} N\right)$$

and the time required for search and update in the grid list may be $$O\left(\log\log_{\frac{1}{\lambda}} N\right).$$

According to some embodiments of the present disclosure, in FD-based clustering module 200 in FIGS. 2A-2B time complexity performance may be:

$$O(\text{Associating and Systemizing Step}) = O(n) + O\left(\log_{\frac{1}{\lambda}} N\right) + O(1)$$

$$O(\text{Trimming Grids and PROCs Step}) = O(n) + O\left(\log_{\frac{1}{\lambda}} N\right)$$

Since the number of comparisons has been reduced by FD-based clustering module 200 in FIGS. 2A-2B, time complexity for merging to provisional clusters list is O(n); in which the number of n is less than number of provisional clusters in Den-Stream, since, in that algorithm, there are two lists to keep potential and outlier provisional clusters.

Furthermore, the clustering quality may be increased by forming provisional clusters (PROC)s from the data points that are surely not outliers. When the calculated grid density reaches a specified threshold, the data points inside that grid may form a mini-cluster. Therefore, there is no need to form a PROC for a newly arrived data point if it cannot be placed in any PROC. The quality of performance is also increased since PROCs are never formed from an outlier. Finally, the evaluation results prove that using an FD-based method for clustering evolving data streams improves the clustering quality results and reduces the computation time as shown and described in detail in FIGS. 7A-7E FIG. 3 is a high-level diagram depicting the associating 240 in FIG. 2 and systemizing 250 in FIG. 2 operations of Fused-Density (FD)-based clustering module 200 in FIGS. 2A-2B, in accordance with some embodiments of the present invention.

According to some embodiments of the present disclosure, FD-based clustering module 200 in FIGS. 2A-2B may use a component such as an online component that may map each data point i.e., input data record in a data stream 310 such as multiple data streams 110 into a grid such as grid 330 or grid 340 in a grid system such as grid system 320.

According to some embodiments of the present disclosure, there may be a component that may operate an FD-based clustering module such as FD-based clustering module 200 in FIGS. 2A-2B, that may calculate the grid density and may cluster one or more grids based on the calculated grid density. The FD-based clustering module 200 in FIGS. 2A-2B may further associate each data point that may be received in the data stream 310 with a grid such as grid 330 or grid 340 or merge it to a Provisional Cluster (PROC) such as PROC 350 and then, systemize the grid system 320 and the PROCs.

According to some embodiments of the present disclosure, the systemizing of the grid system 320 and the PROCs may be performed by the FD-based clustering module 200 in FIGS. 2A-2B in which it may maintain a number of data points in each grid in the grid system 320. Then, the operation of systemizing of the grid system 320 may be performed by the FD-based clustering module 200 in FIGS. 2A-2B, by checking the number of data points in each grid. When the number of data points in a grid such as grid 330 is higher than a calculated dense grid threshold the FD-based clustering module 200 in FIGS. 2A-2B may calculate a weight of the grid.

According to some embodiments of the present disclosure, the calculation of the weight of the grid may be performed by (a) calculating a weight for each read data point according to a preconfigured function in each time unit; (b) calculating a weight for each grid according to a predetermined function in each time unit; and (c) updating the weight for each grid according to a predetermined function.

Figure 4:
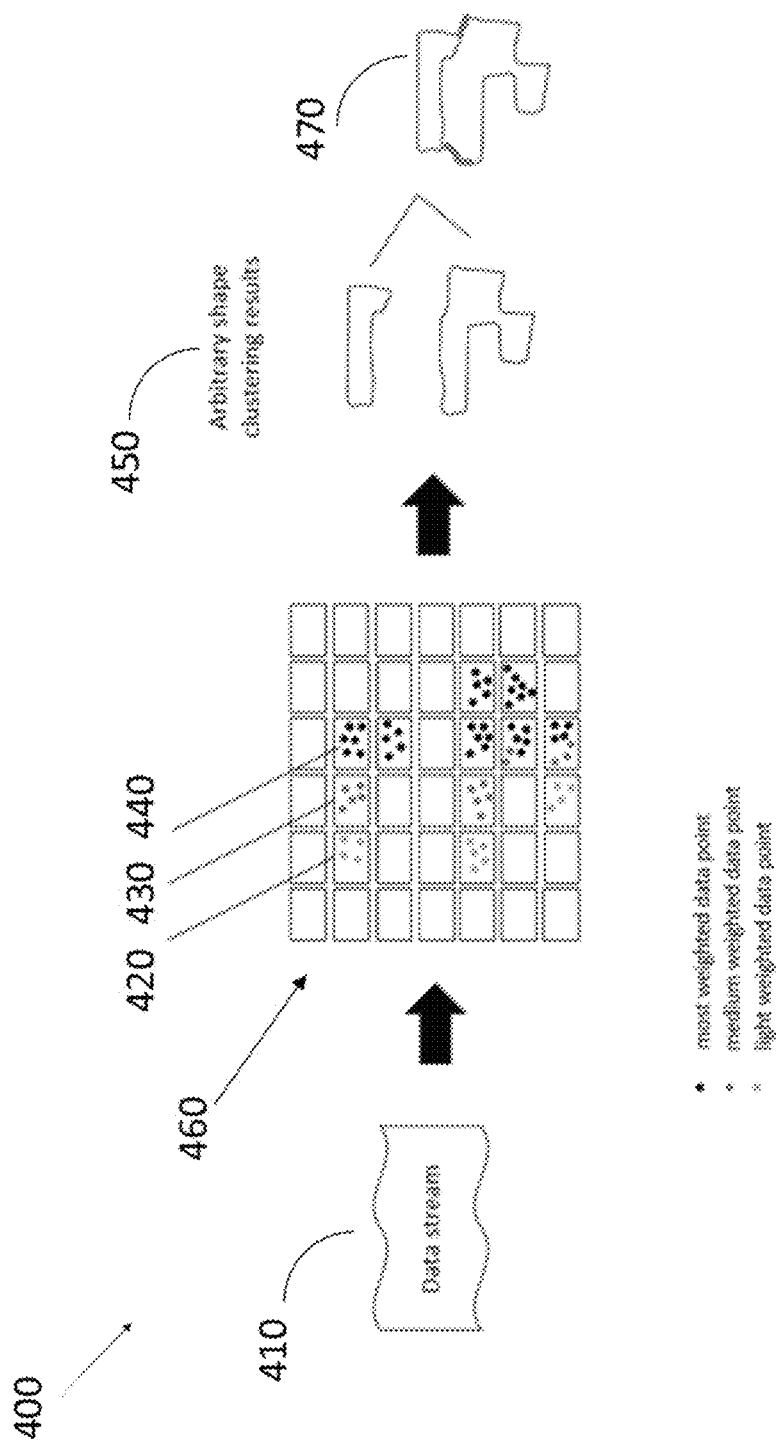
FIG. 4 is a high-level diagram depicting a process of generating a PROC having a shape similar to the pattern in the grid system, in accordance with some embodiments of the present invention.

According to some embodiments of the present disclosure, when one or more grids are forming a pattern in the grid system 320 such as the pattern formed by grids 420, 430 and 440 in FIG. 4 and each one of the grids is a dense grid which is having a calculated weight that is higher than a weight of a prospect PROC, then, the systemizing of the grid system 320 may generate a PROC such as PROC 350 or PROC 450 in FIG. 4 that is having a shape or pattern that is similar to the pattern in the grid system 320, and may calculate weight, center and radius of the generated PROC 350.

According to some embodiments of the present disclosure, a sparse grid that its calculated weight is less than a weight of a prospect PROC such as grid 340 may be discarded by the FD-based clustering module 200 in FIGS. 2A-2B.

According to some embodiments of the present disclosure, the systemizing of the grid system 320 may calculate the weight of each data point according to:

$$w(x, t_c) = w(x \cdot t_p) f(t_c, t_p),$$

whereby:
x is the data point,
$f(t_c, t_p)$ is a fading function,
$t_c$ is current time unit, and
$t_p$ is previous time unit.

According to some embodiments of the present disclosure, the fading function may be calculated according to $$f(t_c) = 2^{-\lambda \cdot t_p},$$

$t_c$ is current time unit,
$t_p$ is previous time unit,
λ is preconfigured and λ>0.

FIG. 4 is a high-level diagram depicting a process 400 of generating a PROC having a shape similar to the pattern in the grid system, in accordance with some embodiments of the present invention;

According to some embodiments of the present disclosure, a data stream of financial data such as data stream 410 or data stream 310 or such as multiple data streams 110 may be received in Data Stream Management System (DSMS) 120 in FIG. 1 that is operating an FD-based clustering module such as FD-based clustering module 200 in FIGS. 2A-2B.

Figure 3:
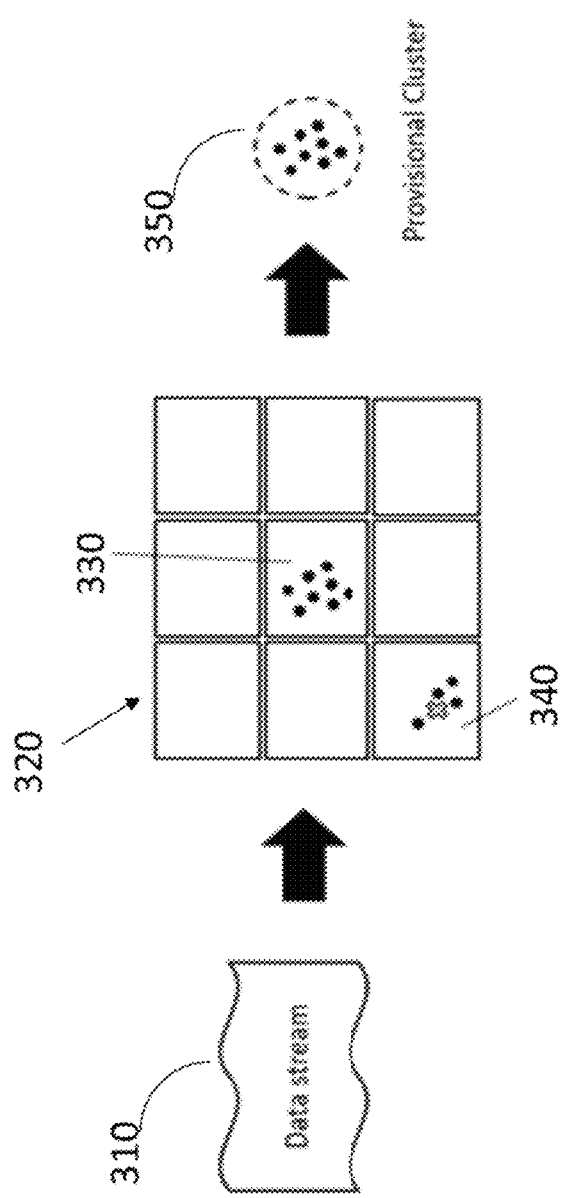
FIG. 3 is a high-level diagram depicting the associating and systemizing operations of the FD-based clustering module, in accordance with some embodiments of the present invention.

According to some embodiments of the present disclosure, each data point in the data stream 410 may be associated with a grid such as grid 420 or 430 or 440 or merged to a PROC such as PROC 350 in FIG. 3 or 450. Then, the DSMS 120 in FIG. 1 may systemize the grid system and the PROCs.

According to some embodiments of the present disclosure, during the systemizing of the grid system such as grid system 460 or grid system 320 in FIG. 3, when the number of data points in a grid 420 or 430 or 440 is higher than a calculated dense grid threshold, the FD-based clustering module may calculate a weight of each grid in the grid system 460.

According to some embodiments of the present disclosure, during the systemizing of the grid system such as grid system 460, the FD-based clustering module may calculate the weight of each grid in the grid system 460 by calculating a weight for each read data point according to a preconfigured function in each time unit, then, calculating a weight for each grid according to a predetermined function in each time unit; and updating the weight for each grid according to a predetermined function.

According to some embodiments of the present disclosure, the weight for each data point in the grid system 460 may be calculated according to a preconfigured function such as $$w(x, t_c) = w(x \cdot t_p) f(t_c, t_p),$$

x is the data point,
$f(t_c, t_p)$ is a fading function,
$t_c$ is current time unit, and
$t_p$ is previous time unit.

According to some embodiments of the present disclosure, since the weight of the data point is calculated in each time unit, the weight of each data point will be decreased from the time the data point is associated to the grid system 460 and after a preconfigured threshold of time, the FD-based clustering module such as FD-based clustering module 200 in FIGS. 2A-2B may discard the data point, i.e., the data point may fade away and hence become not relevant to the clustering process of FD-based clustering module 200 in FIGS. 2A-2B. From the unit time that the data point is read by the FD-based clustering module and until the grid is formed into a PROC or the data point is fading away, its weight may be calculated each time unit and it is decreased from high weight to low weight.

According to some embodiments of the present disclosure, when one or more grids such as grids 420, 430 and 440 are forming a pattern in the grid system 460 and each grid has a calculated weight that is higher than a weight of a prospect PROC, then the FD-based clustering module 200 in FIGS. 2A-2B may generate a PROC such as PROC 450 having a shape similar to the pattern in the grid system 460, and may calculate the weight, center and radius of the generated PROC 450.

According to some embodiments of the present disclosure, each grid in the grid system 460 may include data points having different calculated weight from high to low in each time unit.

According to some embodiments of the present disclosure, the FD-based clustering module 200 in FIGS. 2A-2B may form one or more shape devise clusters such as based on the PROCs such as PROC 450 after a calculated minimum time.

According to some embodiments of the present disclosure, the minimum time may be the minimum time for a provisional cluster to be converted to an outlier. The grids and the provisional clusters i.e., PROCs with the weights less than a threshold are discarded, and the memory space is released as described in detail below by the pseudo-code of FD-based clustering module 200 in FIGS. 2A-2B in lines 21-35 of the pseudo-code detailed herein below.

Figure 5:
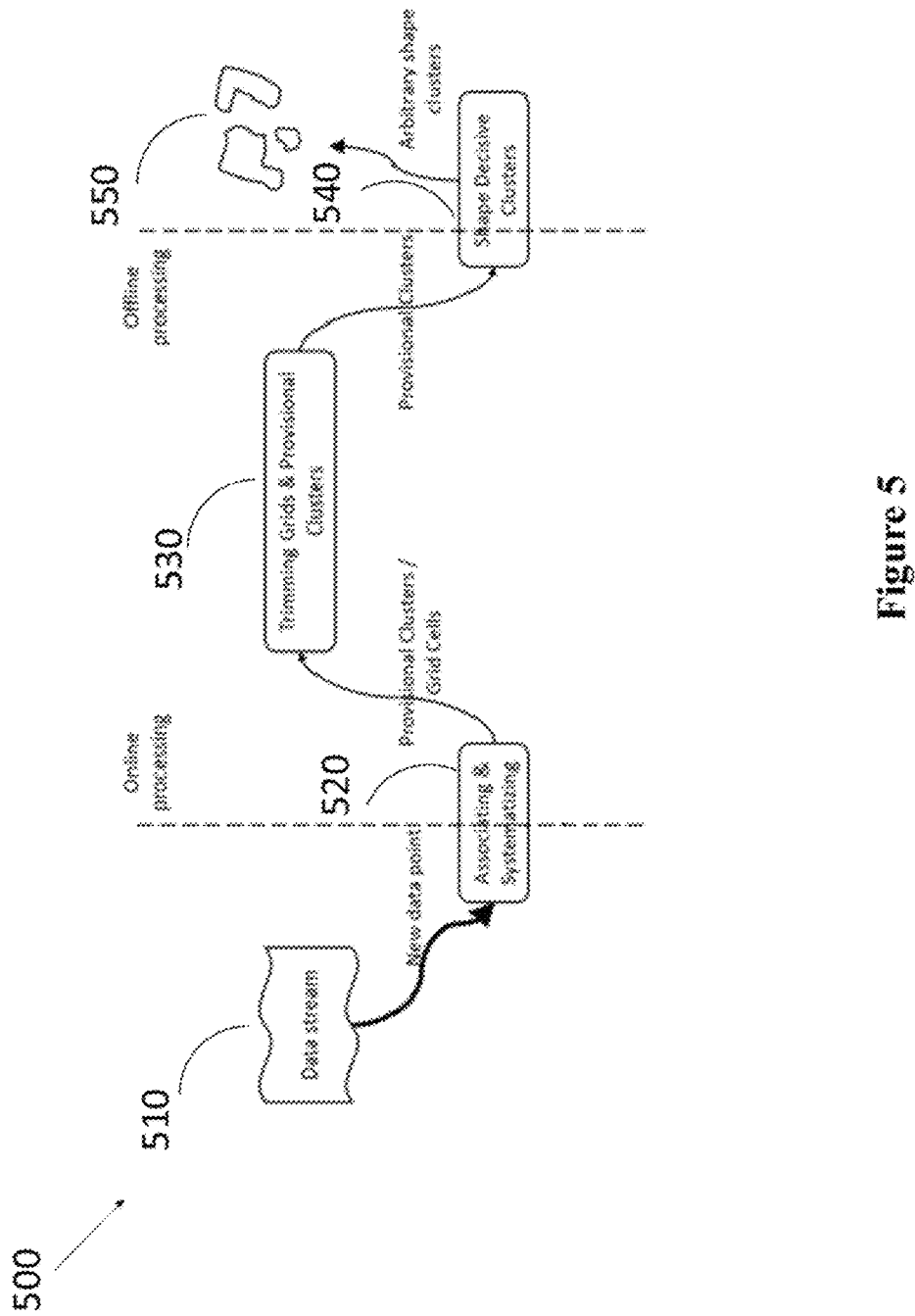
FIG. 5 is a high-level diagram depicting the operation of a FD-based clustering module, in accordance with some embodiments of the present invention.

FIG. 5 is a high-level diagram depicting the operation of a Fused-Density (FD)-based clustering module, in accordance with some embodiments of the present invention.

According to some embodiments of the present disclosure, an FD-based clustering module such as FD-based clustering module 200 in FIGS. 2A-2B may adopt a density decaying technique to capture dynamic changes of a data stream such as data stream 410 or data stream 310 or such as multiple data streams 110 in FIG. 1. The FD-based such as FD-based clustering module 200 in FIGS. 2A-2B may exploit the intricate relationships between the following: the decay factor e.g., λ which determines the fading rate of a data point, α which is a controlling threshold, data density and cluster shape or pattern, the FD-based clustering module 200 in FIGS. 2A-2B may efficiently and effectively generate and adjust the clusters in real time.

According to some embodiments of the present disclosure, the FD-based clustering module 200 in FIGS. 2A-2B may detect and remove sporadic grids which may be mapped by outliers in order to improve the functionality of the computerized resources of the system by reducing the amount of memory space usage and reduce the time that is consumed for the operation of the FD-based clustering module 200 in FIGS. 2A-2B. Additionally, the FD-based clustering module 200 in FIGS. 2A-2B makes high-speed data stream clustering feasible without degrading the clustering quality by the operations of the associating of each data point with a grid or merging it to a PROC 240.

According to some embodiments of the present disclosure, a financial data stream analysis which may be performed by FD-based clustering module 200 in FIGS. 2A-2B, has to consider the following restrictions: (i) data objects e.g., data points arrive continuously; (ii) there is no control over the order in which the data objects are processed; (ii) the size of a data stream is potentially unbounded; (iv) data objects are discarded after they have been processed. Optionally, a part of the data may be stored for a given period of time, using a forgetting mechanism to discard it later; and (v) the unknown data generation process is possibly non-stationary, i.e., its probability distribution may change over time.

According to some embodiments of the present disclosure, a forgetting mechanism may be implemented in the FD-based clustering module 200 in FIGS. 2A-2B on different datasets to examine their behavior on high-dimensional and sparse datasets in an online streaming environment.

According to some embodiments of the present disclosure, an online setting where financial transactions arrive as data points in a financial data stream such as data stream 510 or such as data stream 410 or data stream 310 or multiple data streams 110 in FIG. 1 that is comprised of data points which are read one at a time and need to be assigned to either a new cluster or an existing cluster without the benefit of observing the entire sequence of financial transactions.

According to some embodiments of the present disclosure, in an online process the data points which are read may be associated and systemized 520 e.g., associated such as associated operation 240 in FIG. 2A and systemized such as systemized operation 250 in FIG. 2A by the FD-based clustering module 200 in FIGS. 2A-2B as also described above in detail in FIG. 3.

According to some embodiments of the present disclosure, Provisional Clusters (PROC)s may be generated and grid cells may be maintained by the FD-based clustering module 200 in FIGS. 2A-2B and then one or more grids which their calculated weight is less than a calculated outlier may be trimmed and one or more PROCs which their calculated weight is less than a calculated value of weight of a PROC may be removed 530.

According to some embodiments of the present disclosure, the FD-based clustering module 200 in FIGS. 2A-2B may form one or more shape devise clusters 540 based on the PROCs after a calculated minimum time, optionally in an offline process, to yield shape devise clusters such as shape devise clusters 550.

According to some embodiments of the present disclosure, the FD-based clustering module 200 in FIGS. 2A-2B may operate according to the pseudo-code detailed herein below, in which the input is: data stream, minimum number of neighbors, $\alpha$ which is a controlling threshold and $\lambda$ which determined the fading rate of a data point. The output may be shape devise clusters such as arbitrary shape devise clusters 550. $\varepsilon$ may be a neighborhood of a data point. The neighborhood may be within a radius of $\varepsilon$. A neighborhood of data point p may be calculated or denoted by $N_\varepsilon(p)$.

$$N_\varepsilon(p) = \{q \in D \; \text{dist}(p, q) \leq \varepsilon\},$$

An Euclidean distance is a straight-line distance between two points such as p and q in an Euclidean space. dist(p, q) is an Euclidean distance between two data points such as data points p and q. The minimum number of neighbors of a data point may be the minimum number of data points around a data point p in the $\varepsilon$ neighborhood of data point p. Pseudo-code of FD-based Clustering Module 200 in FIGS. 2A-2B

Pseudo-code of FD-based clustering module 200 in Figs. 2A-2B line 1: $t_{pt} = \log_\lambda^{\alpha/(\alpha-N(1-2^{-\lambda}))}$
line 2: $t_c = 0$
line 3: while not end of stream do
line 4:     //Read data point $x$ from data stream
line 5:     Find nearest minicluster MIC to $x$
line 6:     if dist $(x, C_{PROC}) < r_{PROC}$ then
line 7:         Merge $x$ to the MIC
line 8:     else
line 9:         Map new data point $x$ to grid
line 10:         $n_g = n_g + 1$;
line 11:         $w_g = 2^{-\lambda(t_c-t_p)} w_g t_p + 1$;
line 12:         $t_p = t_c$;
line 13:         Update $GS(n_g, t_p, w_g)$
line 14:         if $(n_g \geq MinPts)$ and $(w_g \geq \frac{\alpha}{N(1-2^{-\lambda})})$ then line 15:             $w_{PROC} = w_g$ line 16:             $C_{PROC} = \frac{\sum_{i=1}^n f(t_c-T_i)p_i}{w_{PROC}}$ line 17:             $r_{PROC} = \frac{\sum_{i=1}^n f(t_c-T_i) dist(p_i, C_{PROC})}{w_{PROC}}$ line 18:         Remove grid $g$ from the grid list
line 19:         endif
line 20:     endif

*Associating & Systemizing* line 21: if $t \bmod t_{TT} == 0$ then
line 22:     for all grid $g$ do
line 23:         $OWT(t_c, t_p) = \frac{\alpha(1-2^{-\lambda(t_c-t_p+1)})}{N(1-2^{-\lambda t_p})}$
line 24:         if $w_g < OWT$ then
line 25:             Remove grid $g$ from the grid list
line 26:         endif
line 27:     endfor
line 28:     for all {PROC} do
line 29:         if $w_{PROC} < \frac{\alpha}{N(1-2^{-\lambda})}$ then
line 30:             Remove PROC from {PROC}
line 31:         endif
line 32:     endfor
line 33: endif
line 34: $t_c = t_c + 1$
line 35: end while

*Trimming Grids & Provisional Clusters*

*line* 36: if clustering request is arrived then
*line* 37:     Generate clusters using modified DBSCAN
*line* 38: endif

Forming Final Clusters Step

Figure 6:
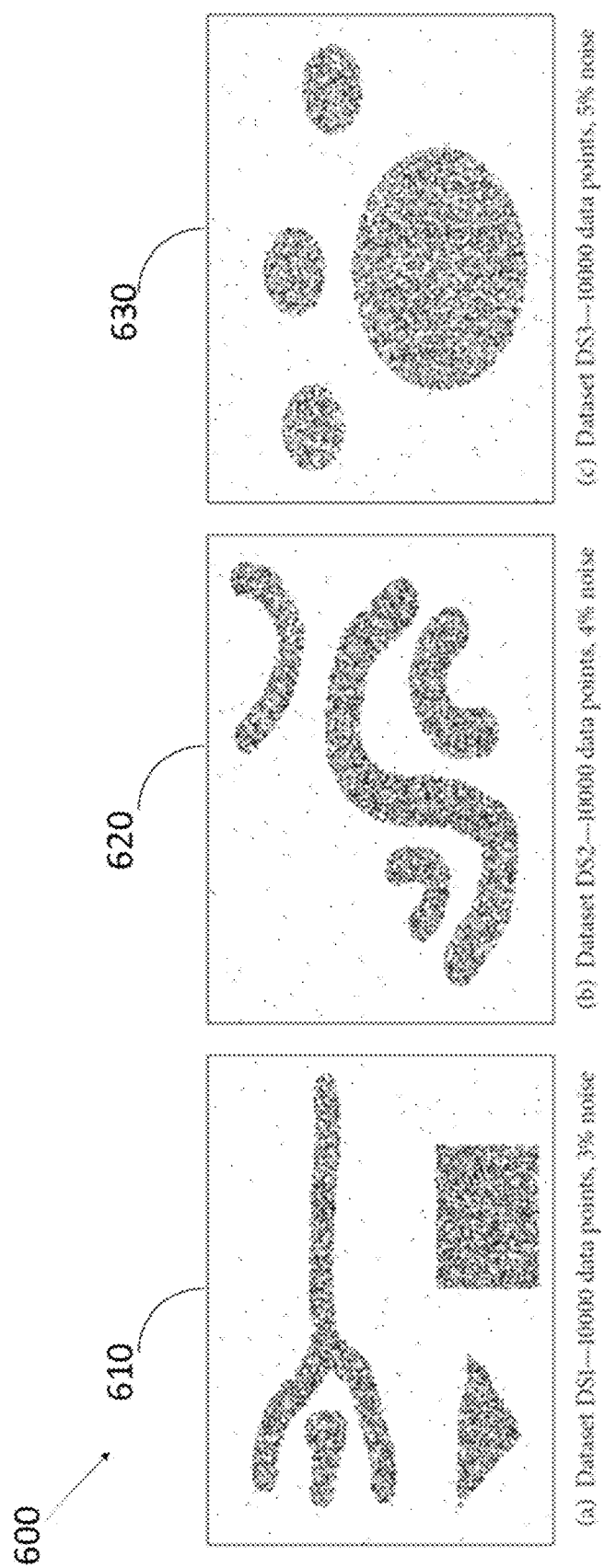
FIG. 6 shows shape device clusters, in accordance with some embodiments of the present invention.

FIG. 6 shows shape device clusters, in accordance with some embodiments of the present invention.

According to some embodiments of the present disclosure, the FD-based clustering module 200 in FIGS. 2A-2B may generate shape devise clusters such as shown by element 610 or element 620 or element 630 to be displayed via a display unit to an analyzer or to be forwarded to an application for further analysis and suspicious financial activity detection.

According to some embodiments of the present disclosure, FD-based clustering module 200 in FIGS. 2A-2B may provide a density-based clustering method for online financial data streams. The method may provide a reduced or fast processing time that may be applicable in real-time application. Experimental results show that the proposed approach which is implemented by FD-based clustering module 200 in FIGS. 2A-2B may obtain high quality results with low computation time on real and synthetic datasets. The experimental results also show that the FD-based clustering module 200 in FIGS. 2A-2B has superior quality and efficiency, and it may be used to generate clusters of arbitrary shapes, and may accurately recognize evolving financial behaviors of real-time financial data streams.

According to some embodiments of the present disclosure, a Density Stream Clustering algorithm DenStream is a machine learning algorithm that may be used in an online incremental streaming manner.

According to some embodiments of the present disclosure, a Density-Stream (D-stream) is a density grid-based clustering machine learning algorithm that may be used in online incremental streaming manner.

According to some embodiments of the present disclosure, a Hybrid Density-based Clustering stream (HDC-Stream) algorithm is a machine learning algorithm that may be used in an online incremental streaming manner.

According to some embodiments of the present disclosure, there may be evaluation metrics for clustering analysis and clusters validity. The objective of the evaluation metrics is to assess clustering results of the FD-based clustering module 200 in FIGS. 2A-2B by comparing existing well-known clustering algorithms. The evaluation metrics may be two well-known measures, such as purity and Normalized Mutual Information (NMI), in order to evaluate the quality of Fused-Density (FD)-Stream e.g., FD-based clustering module 200 in FIGS. 2A-2B.

According to some embodiments of the present disclosure, as to purity measure, the clustering quality may be evaluated by an average purity of the generated clusters which may be defined as follows:

$$\text{purity} = \frac{\sum_{i=1}^{K} (|C_i^d|/|C_i|)}{K} * 100\%$$

whereby K may be the number of the generated clusters, $|C_i^d|$ may be the number of data points with the dominant class label in a cluster i, and $|C_i|$ may be the number of data points in a cluster i. The purity measure may be calculated only for data points which are arriving in a predefined window (H) of time, since the weight of data points may be calculated each time unit and hence may diminish i.e., fade continuously.

According to some embodiments of the present disclosure, as to NMI measure, it is a well-known information theoretic measure that assesses how similar two clusters are. Given a true clustering A={$A_1$ ... $A_k$} and the grouping B={$B_1$ ... $B_h$} which were generated or obtained by a clustering method such as the clustering method which may be implemented by FD-based clustering module 200 in FIGS. 2A-2B, C may be a confusion matrix whose element $C_{ij}$ may be the number of records of a cluster i of A that are also in the cluster j of B. The NMI (A, B), may be defined as:

$$NMI(A, B) = \frac{-2\sum_{i=1}^{c_A} \sum_{j=1}^{c_B} C_{ij}\log(c_{ij}N/C_i \cdot C_j)}{\sum_{i=1}^{c_A} C_i\log(C_i/N) + \sum_{j=1}^{c_B} C_j\log(C_j/N)}$$

whereby $C_A(C_B)$ is the number of groups in the partition A(B), $C_i(C_j)$ is the sum of the elements of C in row i (column j), and N is the number of data points. If A=B, NMI (A, B)=1, and if A and B are completely different, NMI (A, B)=0. The parameters of FD-Stream received by FD-based clustering module 200 in FIGS. 2A-2B may adopt the following settings as input: fading rate factor such as decay factor λ=0.25, minimum number of data points MinPts=30, and α=0.8. The parameters for DenStream and D-Stream are chosen to be the same.

Figure 7A:
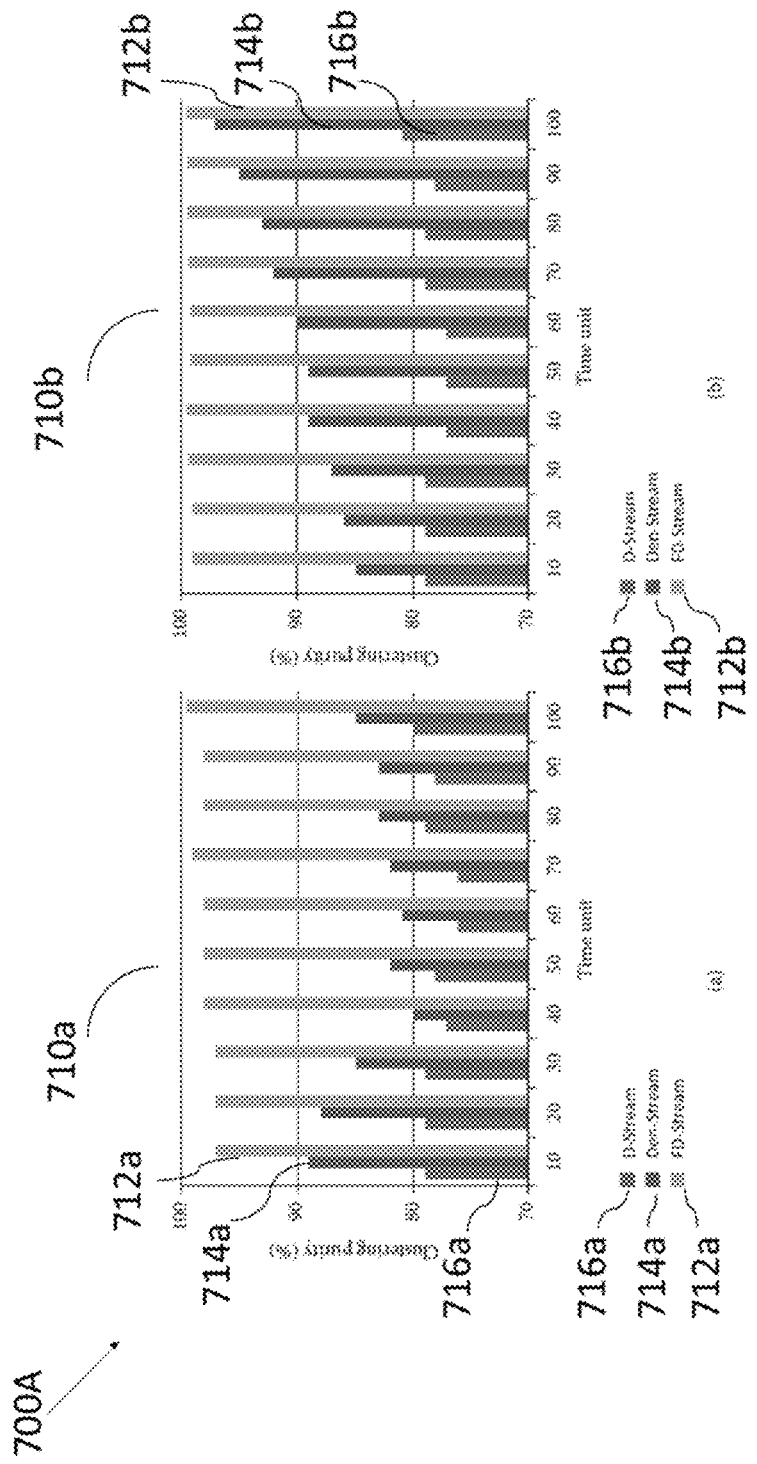
FIG. 7A shows experimental results when cluster purity of Fused-Density (FD)-Stream for Evolving Data Stream (EDS) with scenario (a) horizon=1 and stream speed=2000 and scenario (b) horizon=5 and stream speed=2000, in accordance with some embodiments of the present invention.
Figure 7B:
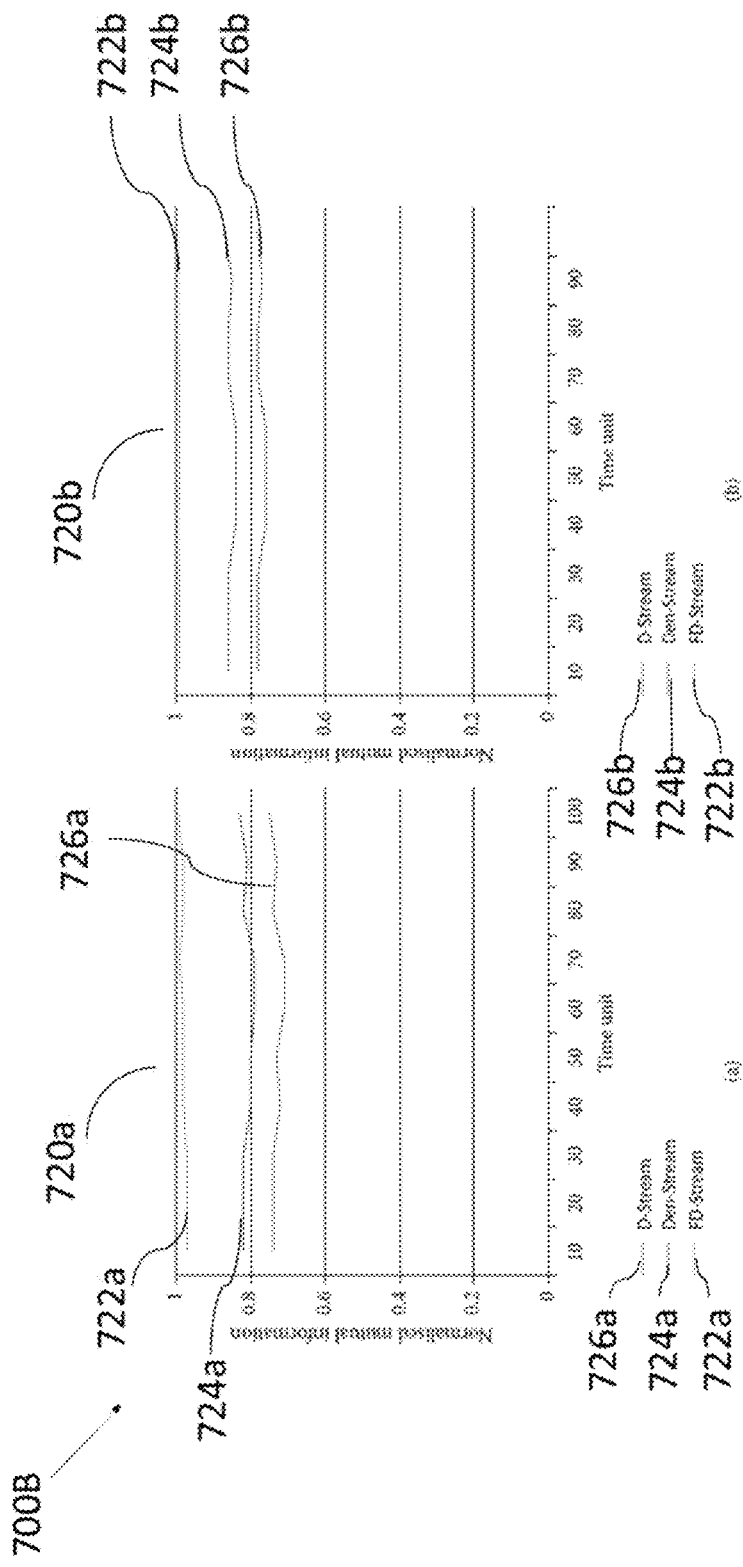
FIG. 7B shows experimental results when Normalized mutual information of Hybrid Density-based Clustering algorithm for data stream (HDC)-Stream for EDS with scenario (a) horizon=1 and stream speed=2000 and scenario (b) horizon=5 and stream speed=2000, in accordance with some embodiments of the present invention.

FIG. 7A shows experimental results 700A when cluster purity of Fused-Density (FD)-Stream for Evolving Data Stream (EDS) with scenario (a) 710a where horizon=1 and stream speed=2000 and scenario (b) where horizon=5 and stream speed=2000, in accordance with some embodiments of the present invention.

According to some embodiments of the present disclosure, the evaluation of FD-Stream 712a and 712b on Synthetic Datasets is shown 710a diagram and 710b diagram. FIG. 7A shows the purity results of FD-Stream 712a and 712b compared to DenStream 714a and 714b and D-Stream 716a and 716b on a data stream. Diagram 710a shows that the data stream speed is set to 2000 data points per time unit and horizon H=1. FD-Stream 712a shows a good clustering quality. Its clustering purity is higher than 97%. Diagram 710b shows similar results to diagram 710a. Accordingly, it may be concluded that FD-Stream 712a and 712b achieves much higher clustering quality than DenStream 714a and 714b and D-Stream 716a and 716b in two different horizon values. For example, in horizon H=1, time unit 50, FD-Stream 712a has 98% while DenStream 714a and D-Stream 716a have purity values as 82% and 78%, respectively.

FIG. 713 shows experimental results when Normalized mutual information of Hybrid Density-based Clustering algorithm for data stream (HDC)-Stream for EDS with scenario (a) horizon=1 and stream speed=2000 and scenario (b) horizon=5 and stream speed=2000, in accordance with some embodiments of the present invention. The experiments have been repeated with the same horizon and stream speed and the results are presented in diagrams 720a and 720b. The experimental results which are presented in diagrams 720a and 720b show a noticeable high NMI score for FD-Stream 722a and 722b compared to DenStream such as 724a and 724b and D-Stream such as 726a and 726b.

According to some embodiments of the present disclosure, the experiments have been conducted without noise.

Figure 7C:
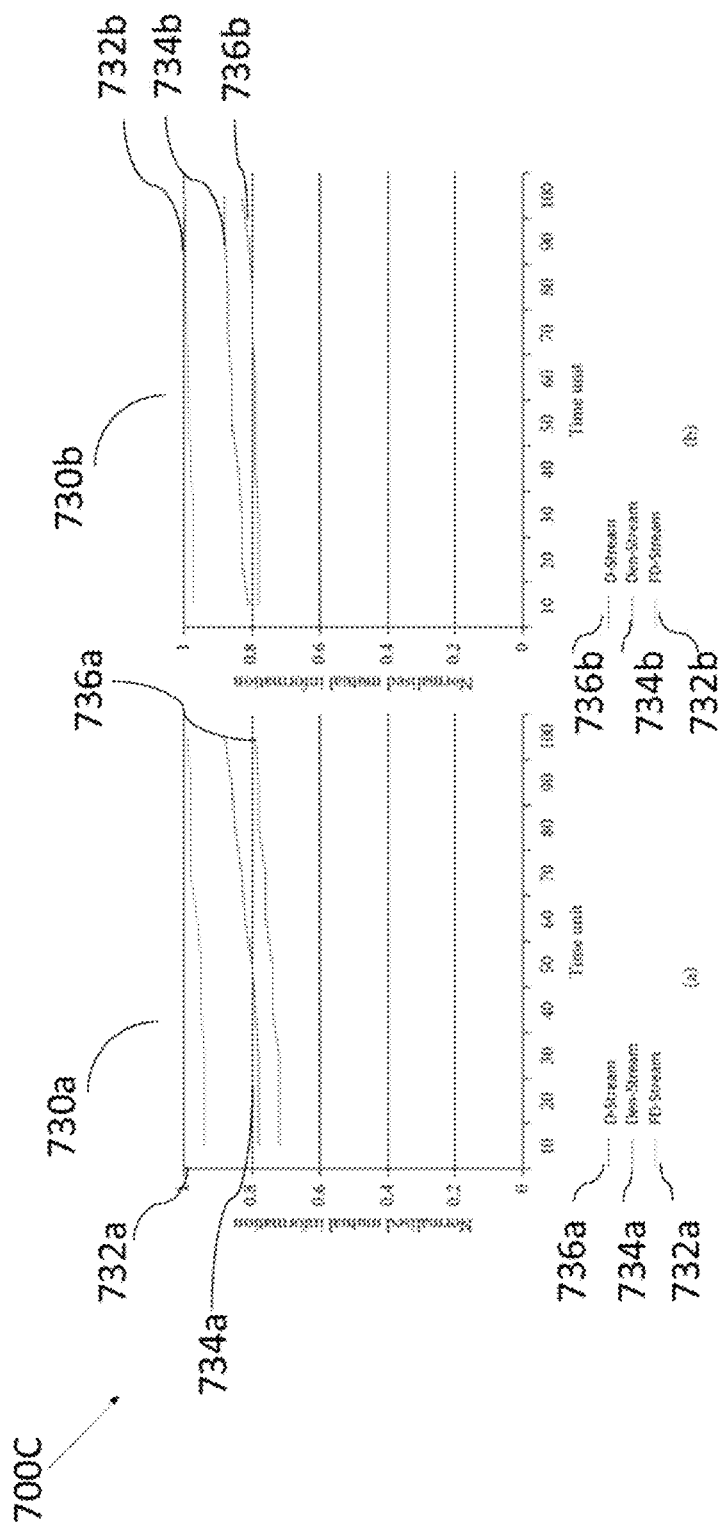
FIG. 7C shows experimental results when Normalized Mutual Information (NMI) of FD-Stream on synthetic dataset with scenario (a) horizon=1 and stream speed=1000, scenario (b) horizon=5 and stream speed=1000, in accordance with some embodiments of the present invention.

FIG. 7C shows experimental results 700C when Normalized Mutual Information (NMI) of FD-Stream on synthetic dataset with scenario (a) horizon=1 and stream speed=1000, scenario (b) horizon=5 and stream speed=1000, in accordance with some embodiments of the present invention.

According to some embodiments of the present disclosure, the NMI results on Network Intrusion Detection dataset in shown in FIG. 7C. The results in diagram 730a have been determined by setting the horizon to 1 and the results in diagram 730b have been determined by setting the horizon 5, whereas the stream speed is 1000 for both 730a and 730b diagrams. The values of NMI for FD-Stream approach 732a and 732b is almost 1 for both horizon values. Diagrams 730a and 730b demonstrate that FD-Stream 732a in diagram 730a and FD-Stream 732b in diagram 730b detects the true class labels of data more accurately than DenStream 734a and 734b and D-Stream 736a and 736b do.

Figure 7D:
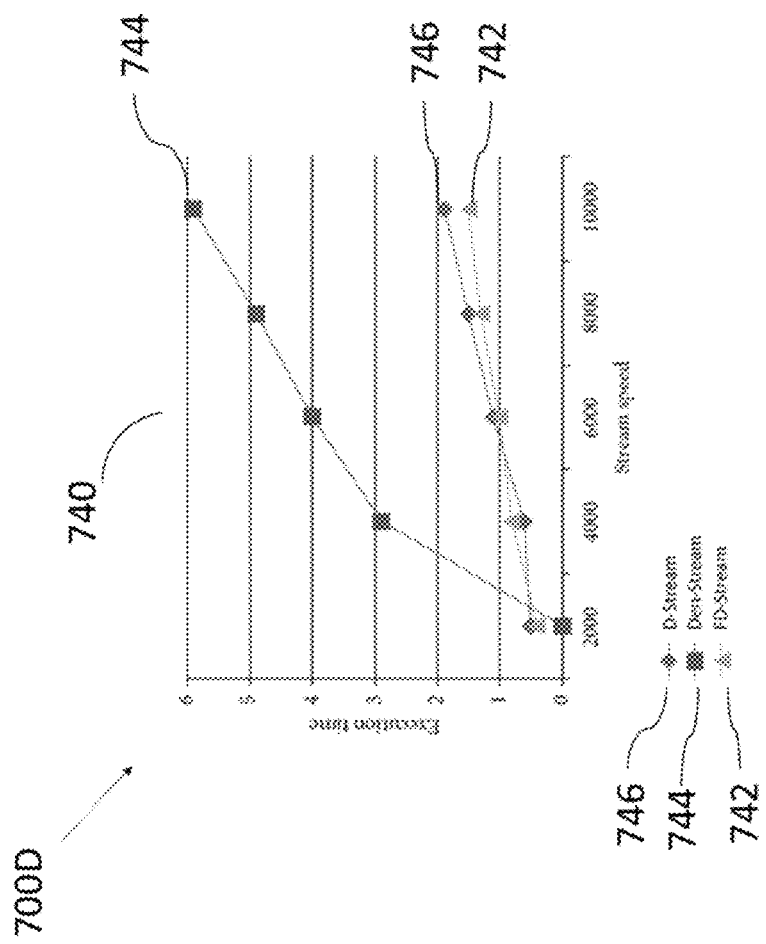
FIG. 7D shows execution time for increasing data stream lengths 700D on streaming dataset, in accordance with some embodiments of the present invention.

FIG. 7D shows execution time for increasing data stream lengths 700D on streaming dataset, in accordance with some embodiments of the present invention.

According to some embodiments of the present disclosure, scalability results may be presented by the execution time. The execution time of FD-Stream 742 may be influenced by the number of data points which are processed at each time unit, that is, the data stream speed. Diagram 700D shows the execution time in seconds on Network Intrusion Detection dataset for FD-Stream 742 compared to DenStream 744 and D-Stream 746, when the stream speed augments from 1000 to 10,000 data points per time unit.

DenStream 744 has higher processing time because it requires a merging task which is time consuming. Therefore, FD-Stream 742 has lower execution time compared to DenStream 744 and D-Stream 746. The execution time of DenStream 744 and D-Stream 746 increases linearly with respect to the stream speed.

According to some embodiments of the present disclosure, scalability results may be represented by memory usage. The memory usage of HDC-Stream is O(n+g) which is the total number of provisional clusters and grids.

Figure 7E:
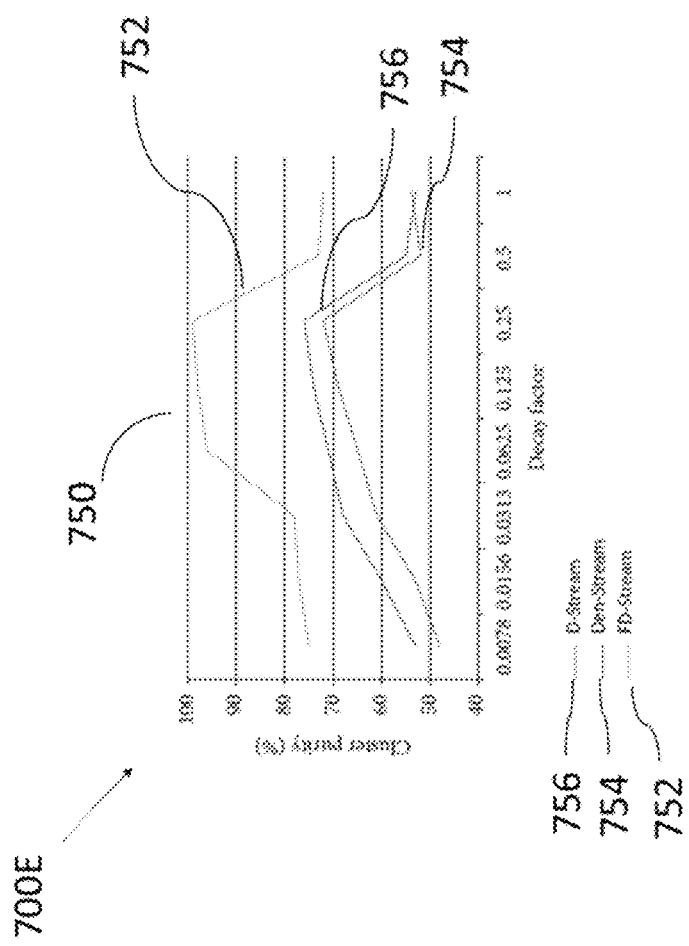
FIG. 7E shows cluster quality versus decay factor, in accordance with some embodiments of the present invention.

FIG. 7E shows cluster quality versus decay factor 700E, in accordance with some embodiments of the present invention.

According to some embodiments of the present disclosure, sensitivity analysis may be performed by checking various values of parameter λ which is an important parameter of FD-Stream λ because it determines the fading rate of a data point. In other words, λ controls the importance of historical data. The quality of clustering e.g., FD-Stream on different values of λ ranging from 0.0078 to 1 is presented in diagram 700E. When parameter λ is too small or too large, the clustering quality of the FD-Stream 752 becomes poor. For example, when λ=0.0078, the purity of FD-Stream 752 is about 75%. However, the quality of HDC-Stream is still higher than that of Den-Stream 754 and D-Stream 756. It is proved that if λ parameter varies from 0.0625 to 0.25, the clustering quality is quite good, stable, and always above 96%.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for real-time detection of new threats of financial transactions suspicious for money laundering, by processing high-speed streaming financial data, wherein the financial data comprises a set of data points which identify individual transactions, said computerized-method comprising:

receiving in real-time by a processor, a high-speed financial data stream comprised of data points, wherein the data points are received during a time unit preconfigured to be any value and comprise an ordered sequence of instances or financial records associated with a financial transaction, operating by the processor a Fused-Density (FD)-based clustering module, wherein the module comprises a plurality of sequential density based clustering algorithms, said FD-based clustering module is configured to:

(i) read data points in the received financial data stream;

(ii) maintain a grid system of one or more grids;

(iii) maintain one or more provisional clusters (PROC)s which are formed as a pattern out of the grid system;

(iv) associate each data point with a grid by merging it into a PROC, wherein if the data point cannot be merged into a new or an existing PROC it is mapped to an outlier grid, wherein merging the data point into a PROC comprises:

(a) for each PROC maintaining a center point of each PROC;

(b) for each data point in each grid maintaining a radius within a calculated neighborhood;

(c) calculating a distance between each data point and a center of each PROC in the one or more PROCs;

(v) when a calculated distance between the data point and the center of a related PROC is less than a radius of the related PROC:

(d) merging it into the PROC; and (vi) when the calculated distance between the data point and the center of a related PROC is greater or equal to the radius of the related PROC:

(e) associating it to a grid in the grid system according to predefined distance metrics, wherein a PROC is not formed from an outlier data point;

(vii) systemize the grid system and the PROCs, wherein the systemizing comprises:
- (a) maintaining a number of data points in each grid in the grid system;
- (b) checking the number of data points in each grid; when the number of data points in a grid is higher than a calculated dense grid threshold:
- (c) calculating a weight of the grid in the grid system by:
  a. calculating a weight for each read data point according to a preconfigured function in each time unit;
  b. calculating a weight for each grid according to a predetermined function in each time unit; and
  c. updating the weight for each grid according to a predetermined function;, wherein the updating of the weight of each grid comprises recalculating the weight of each data point according to the predetermined function and summing all the recalculated weights, wherein each data point is attributed with a timestamp, and
  when one or more grids are forming a pattern in the grid system and each one having a calculated weight that is higher than a weight of a prospect PROC, then:
- (d) generating a PROC having a shape similar to the pattern in the grid system, and calculating weight, center and radius of the generated PROC;

(viii) trim one or more grids if their calculated weight is less than a calculated outlier and remove one or more PROCs if their calculated weight is less than a calculated value of weight of a PROC;

(ix) form one or more shape devise clusters based on the PROCs after a calculated minimum time, wherein cluster quality is enhanced by removal of data points according to a time-based decay factor which determines the fading rate of a data point, and wherein the removal comprises a grid density decaying technique to capture dynamic changes of the data stream;

(x) transmit the one or more shape devise clusters to a computerized-device and display, on the computerized-device, the shape devise clusters for analysis thereof to yield assumptions or interpretations as to suspicious financial activity, wherein the clusters' shape, contour, or pattern; and (xi) enable detection of new threats of financial transactions suspicious for money laundering according to the one or more shape devise clusters which were formed out of the high-speed streaming financial data received in real-time, wherein the number of shape devise clusters is self-defining by the method and the number of clusters is not predefined by the user, and wherein money laundering changing trends are detected by online incremental unsupervised machine learning models learning on new data points, thereby providing a memory efficient method.

2. The computerized-method of claim 1, wherein the preconfigured function to calculate the weight of each data point is:

$$w(x, t_c) = w(x \cdot t_p) f(t_c, t_p),$$

wherein x is the data point,
wherein $f(t_c, t_p)$ is a fading function,
wherein $t_c$ is current time unit, and
wherein $t_p$ is previous time unit.

3. The computerized-method of claim 1, wherein the calculated weight decreases in each time unit compared to calculated weight in preceded time unit.

4. The computerized-method of claim 1, wherein the predetermined function to calculate the weight of each grid is:

$$w(g, t_c) = \sum_{x \in g} 2^{-\lambda(t_c - t_x)}$$

wherein g is the grid,
wherein $t_c$ is a current time unit,
wherein $\lambda$ is preconfigured and $\lambda > 0$,
wherein $t_x$ is a timestamp of data point x in the grid.

5. The computerized-method of claim 1, wherein the updating of the weight of each grid is further performed by recalculating the weight of each data point according to the predetermined function and summing all the recalculated weights
wherein each data point is attributed with a timestamp, and wherein the predetermined function is:

$$w_g(t_c, x) = 2^{-\lambda(t_c - t_p)} \cdot w_g(t_p) + 1$$

wherein g is the grid,
wherein x is a data point,
wherein $t_c$ is a current time unit,
wherein $\lambda$ is preconfigured and $\lambda > 0$,
wherein $t_p$ is previous time unit.

6. The computerized-method of claim 1, wherein the calculating of dense grid threshold is performed according to:

$$w_g(t) \geq \alpha/N(1 - 2^{-\lambda})$$

wherein $w_g(t)$ is a weight of a grid in time unit t,
wherein $\alpha$ is a maximum preconfigured value,
wherein $\lambda$ is preconfigured and $\lambda > 0$, and
wherein N is the number of data points in the grid.

7. The computerized-method of claim 2, wherein the fading function is:

$$f(t_c) = 2^{-\lambda t_p}, \text{ wherein } \lambda \text{ is preconfigured and } \lambda > 0.$$

8. The computerized-method of claim 1, wherein the calculated outlier is according to:

$$OWT(t_c, t_p) = \frac{\alpha}{N} \sum_{i=0}^{t_c - t_p} 2^{-\lambda i} = \frac{\alpha(1 - 2^{-\lambda(t_c - t_p + 1)})}{N(1 - 2^{-\lambda t_p})}$$

wherein $t_c$ is a current time unit,
wherein $t_p$ is previous time unit.
wherein $\lambda$ is preconfigured and $\lambda > 0$,
wherein $\alpha$ is a maximum preconfigured value,
wherein N is the number of data points in the grid.

9. The computerized-method of claim 1, wherein the calculated value of weight of a PROC or a prospect PROC is performed according to:

$$w_{PROC} = w_g(t), w_g(t) = \frac{\alpha}{N(1 - 2^{-\lambda})}$$

wherein $w_{PROC}$ is a weight of a PROC or a prospect PROC, wherein $w_g(t)$ is a weight of a grid in time unit t, wherein λ is preconfigured and λ>0, wherein α is a maximum preconfigured value, wherein N is the number of data points in the grid.

10. The computerized-method of claim 1, wherein the calculated minimum time is performed according to:

$$t_{TT} = \log_\lambda \frac{\alpha}{\alpha - N(1 - 2^{-\lambda})}$$

wherein λ is preconfigured and λ>0, wherein α is a maximum preconfigured value, wherein N is the number of data points in the grid.

* * * * *